United States Patent

Backes et al.

[11] Patent Number: 5,839,232
[45] Date of Patent: Nov. 24, 1998

[54] SEALING OR GUIDING ASSEMBLIES

[75] Inventors: Heinz-Peter Backes, Wegberg; Heinz Andrzejewski, Viersen, both of Germany

[73] Assignee: Draftex Industries Limited, Edinburgh, United Kingdom

[21] Appl. No.: 819,446

[22] Filed: Mar. 17, 1997

Related U.S. Application Data

[63] Continuation of Ser. No. 370,726, Jan. 10, 1995, abandoned.

[30] Foreign Application Priority Data

Jan. 11, 1994 [GB] United Kingdom .................. 9400408
Apr. 25, 1994 [GB] United Kingdom .................. 9408136

[51] Int. Cl.⁶ ........................................ E06B 7/16
[52] U.S. Cl. ......................... 49/479.1; 49/475.1
[58] Field of Search ................... 49/440, 441, 475.1, 49/479.1

[56] References Cited

U.S. PATENT DOCUMENTS 4,183,778 1/1980 Mesnel .

FOREIGN PATENT DOCUMENTS

| 0605092 | 10/1993 | European Pat. Off. . |
| 2332409 | 10/1976 | France . |
| 1084298 | 6/1966 | United Kingdom . |
| 2259730 | 3/1993 | United Kingdom . |
| 1544420 | 7/1996 | United Kingdom . |

*Primary Examiner*—Jerry Redman
*Attorney, Agent, or Firm*—Leydig, Voit & Mayer, Ltd.

[57] ABSTRACT

A sealing or guiding assembly for sealing or guiding the corner of a movable window glass, such as for the window in a motor vehicle door, comprises two lengths of sealing or guiding strips connected together at a corner. The corner is bridged across by a flexible flap which is produced by an in-situ moulding operation. The moulding operation is carried out so that the flap is connected to each sealing strip only over a small area. The flap is therefore otherwise spaced from each sealing strip by a gap which, during the moulding operation, is occupied by a plate defining part of the mould cavity. This plate and the gap protect an adjacent flocked area of a lip from damage by the heat of the moulding operation. The flap defines a shallow groove or ridge matching a ridge or groove either on the sealing strip or on a rigid support to which the strip and flap are to be attached. The groove-ridge pair engage each other when the two lengths of sealing strip and the flap are together placed into position on the rigid support, so that the areas of the flap which overlap each sealing strip to move into contact with the sealing strip and are held in such contact by the rigid support.

12 Claims, 5 Drawing Sheets

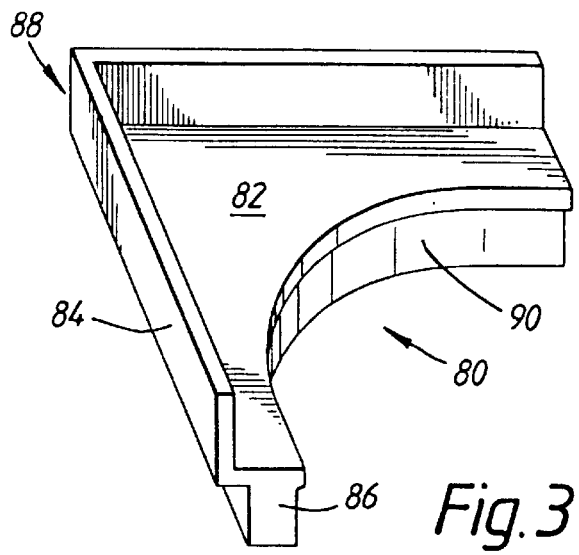
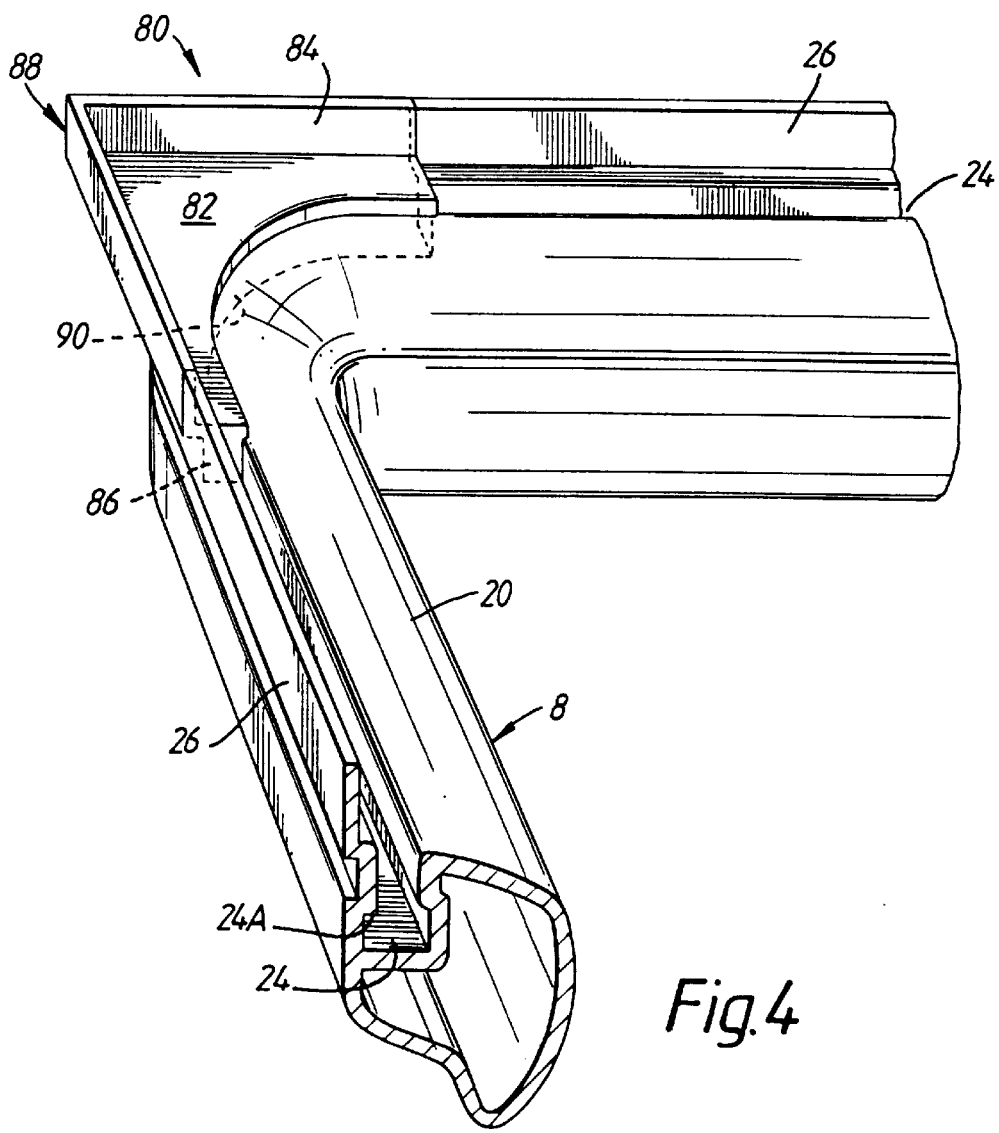

SEALING OR GUIDING ASSEMBLIES

This application is a Continuation of application Ser. No. 08/370,726, filed Jan. 10, 1995, abandoned and application Ser. No. 08/618,856, filed Mar. 20, 1996, which is a divisional of Ser. No. 08/370,726.

BACKGROUND OF THE INVENTION

The invention relates to sealing or guiding assemblies and methods of making them. Embodiments of the invention, to be described in more detail below, are window sealing and guiding strip assemblies for use in motor vehicle body construction and, in particular, for use in window frames forming the upper part of vehicle doors, the sealing or guiding strip assembly being attached to the window frame and supporting the edge of a window pane which can be raised from and lowered into the lower part of the door. However, the invention is not restricted to such applications.

BRIEF SUMMARY OF THE INVENTION

According to the invention, there is provided a sealing or guiding strip assembly, comprising strip means and a portion of flexible material overlapping an area of the strip means and attached to the strip means over a restricted part, only, of the said area, the said portion being formed in situ on the strip means by a heat-moulding operation, the portion having first and second possible positions relative to the strip means, the first position being a position operative during the moulding operation and being a position in which the portion is spaced from the strip means over the majority of the said area so that: the material of the strip means is protected from damage by the heat of the moulding operation, and the second position being a position adopted after the completion of the moulding operation and being a position in which the portion is immediately adjacent to the strip means over the said area.

According to the invention, there is further provided a sealing or guiding strip assembly for sealing or guiding a sharp corner of a window pane, comprising two lengths of strip secured together to define the sharp corner and together defining a guide channel for receiving the window pane, and a generally planar portion of flexible material produced in situ by a heat-moulding operation so as to bridge across the sharp corner and to overlap a respective area of each strip adjacent the guide channel, the said portion being separate from each strip over a major part of the said area and being attached to each strip over an attachment region forming a minor part of the said area, the said portion having a first position relative to the strips in which position it is formed by the moulding operation and so that it is spaced from each strip over the major part of each said area whereby the material of each strip is substantially unaffected by the heat of the moulding operation, and a second position relative to each strip in which it is in contact with each strip over the major part of each said area.

According to the invention, there is further provided a method of heat-moulding a portion of flexible material onto a length of sealing or guiding strip which has a region susceptible to damage by heat, comprising the steps of defining a mould cavity for the moulding operation so that the cavity is spaced from the strip over a major part of a predetermined area of the strip immediately adjacent the said region and is connected with the strip over a minor part of the said area which is spaced from the said region, whereby the said portion of flexible material is mouldingly attached to the strip over the minor part of the area but is spaced from the major part of the area so that the said region is protected from damage by the heat of the moulding operation, the said portion of flexible material being thereafter movable into a position in which it is in contact with the strip over the major part of the said area.

BRIEF DESCRIPTION OF THE DRAWINGS

A window sealing and guiding strip assembly embodying the invention, and a method according to the invention of making it, will now be described, by way of example only, with reference to the accompanying diagrammatic drawings in which:

FIG. 3 is a perspective view of a corner support for the sealing and guiding strip assembly;

FIG. 4 is a perspective view of the frame of FIG. 2 but also showing the corner support of FIG. 3 in position thereon;

DESCRIPTION OF PREFERRED EMBODIMENTS

Figure 1:
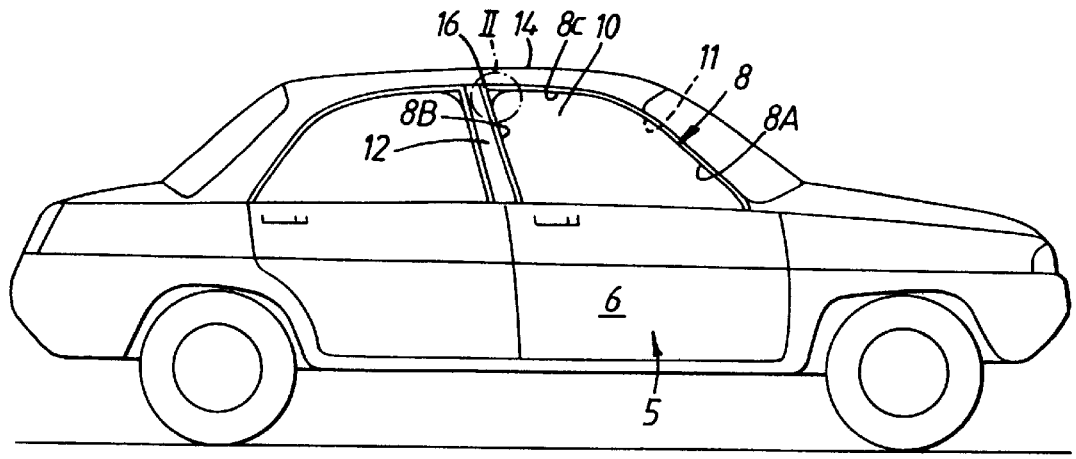
FIG. 1 is a side view of a motor vehicle body.

FIG. 1 shows the side of a motor vehicle body having a door 5 with a lower part 6 carrying a window frame indicated diagrammatically at 8 for a window opening 10. In the usual way, a window glass for the opening 10 can be raised from and lowered into the lower part 6 of the door. The frame 8 carries the sealing and guiding strip (not visible in FIG. 1) which will be described in more detail below.

The frame 8 comprises a part 8A along the sloping front of the door which is alongside the so-called "A" pillar of the vehicle body, a generally vertical part 8B alongside the so-called "B" pillar 12 of the vehicle body, and a part 8C running along the top of the door. Where the "B" pillar 12 meets the roof 14 of the vehicle, a sharp angle (substantially 90°) is formed, at 16. In a manner to be explained below, the sealing and guiding strip assembly to be described combines with the frame 8 to form a corresponding sharp angle 18.

Figure 2:
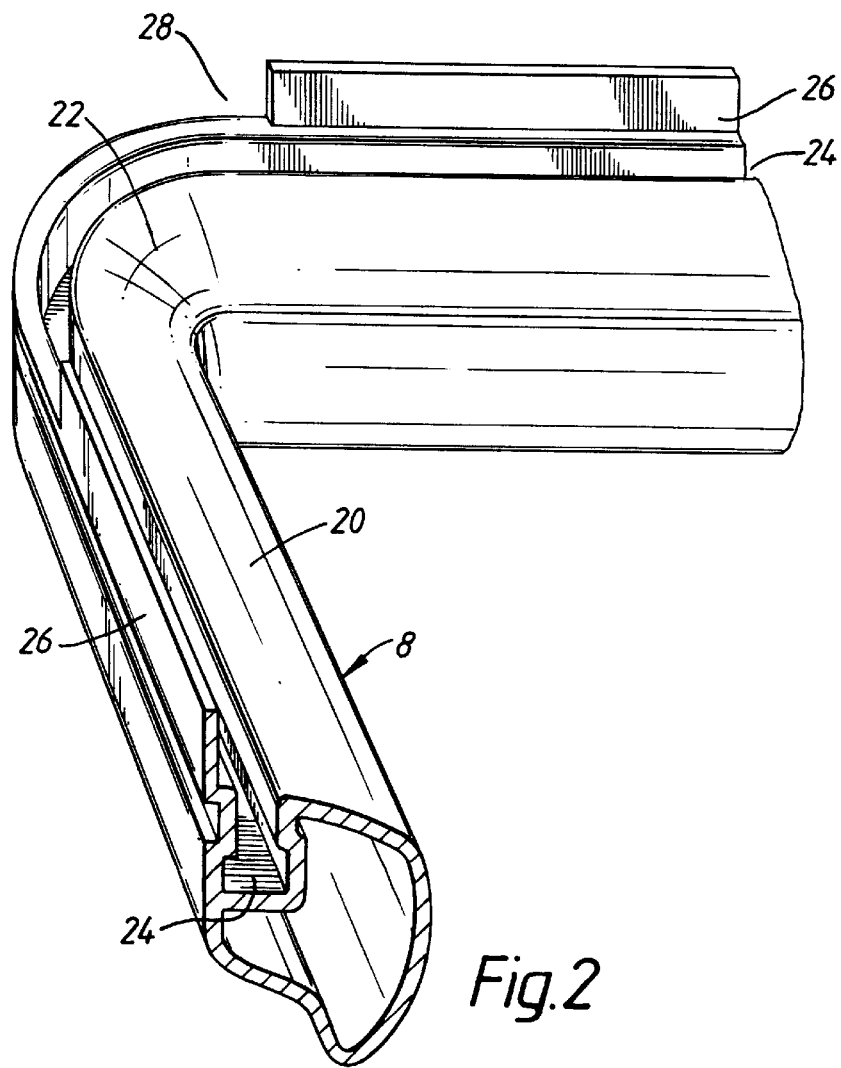
FIG. 2 is a diagrammatic perspective view of part of the window frame shown circle at II in FIG. 1 but omitting the window sealing and guiding strip assembly.

The frame 8 carried by the door is (in this example) made of metal, such as extruded aluminium. FIG. 2 shows part of the frame 8 at the corner 18 and is an enlarged view of the region II of FIG. 1. The sealing and guiding strip assembly is omitted from FIG. 2. As indicated in FIG. 2, the frame is made of a hollow aluminium extrusion 20 which has a curved portion 22 at the corner 18. As shown in FIG. 1, therefore, this curved portion 22 bridges across the sharp corner.

Facing outwardly of the vehicle, the aluminium extrusion 20 defines a channel 24 and an outwardly protruding flange 26. However, it will be noted that the flange 26 is interrupted (that is, omitted) over the curved region 22 of the extrusion, so as to form a gap 28.

FIG. 3 shows a corner support 80 which is separately constructed from metal such as aluminium and, in a manner to be explained, is shaped and sized to fit the gap 28 (FIG. 2). The corner support 80 is of simple construction comprising a platform 82 which, on one side, carries a flange 84 of the same general thickness as the flange 26 on the aluminium extrusion 20 (see FIG. 2) and, on its other side, carries a thicker shoulder 86. The corner support 80 is shaped to provide an outside edge 88 which matches the angle of the corner 18. Its opposite edge 90 is curved to match the outside radius of the curved portion 22 (see FIG. 2) of the aluminium extrusion 20.

FIG. 4 shows the corner piece 80 mounted in position on the aluminium extrusion 20. The shoulder 86 (FIG. 3) of the corner piece 80 is slotted into the channel 24 over the curved region 28 of the aluminium extrusion 20 (FIG. 2), and is a tight fit in the channel. The flange 84 of the corner piece 80 is thus aligned with the flange 26 of the aluminium extrusion; together, they form a continuous flange having a sharp angle (substantially 90°) matching the angle shown at 16 in FIG. 1. In the manner to be explained, this continuous flange, made up of the separate flanges 26 and 82, supports the sealing strip.

Figure 5:
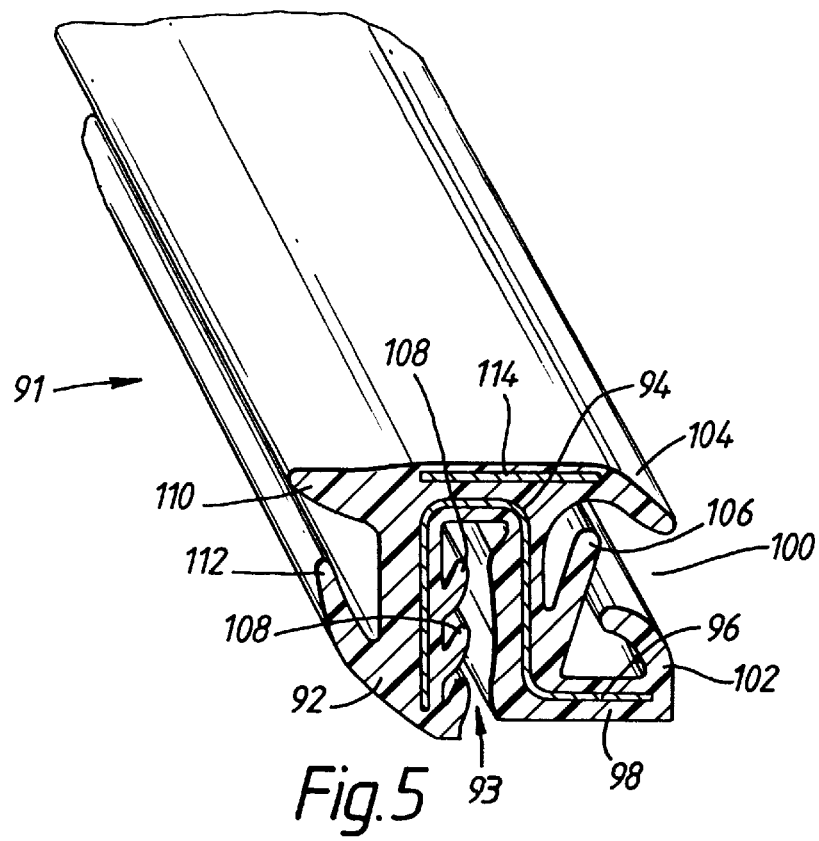
FIG. 5 is a perspective sectional view of a sealing and guiding strip used in the assembly.

FIG. 5 shows one form which the sealing strip 91 can take.

As indicated, it comprises extruded material 92, such as plastics or rubber material, which defines a channel 93 and incorporates a channel-shaped metal carrier 94. The carrier 94 may take any suitable form. It may be in the form of a continuous unapertured metal channel. Instead, it may be apertured to increase its flexibility. In another form, it comprises a series of side-by-side generally U-shaped metal elements defining the channel and either entirely disconnected from each other or connected such as by short integral flexible connecting links. In a further form, the carrier comprises looped wire. Other possible forms of carrier may be used, though. As shown, the carrier 94 has an integral extension 96 which extends at right angles to the channel 93.

The carrier extension 96 reinforces a wall 98 of a window glass receiving channel 100. The wall 98 is integral with a re-entrant lip 102, and the opposite wall of the glass-receiving channel 100 is formed by a lip 104. A further lip 106 is mounted on the base of the channel 100.

In use, the sealing strip 91 is mounted in position on the flange 26 or the flange 84 (FIGS. 3 and 4) by positioning the strip so that the flange engages in the channel 93. The strip 91 firmly grips the flange, the gripping force being assisted by the resilience of the metal carrier 94 and also by the provision of integral flexible lips 108 which extend inwardly of the channel 93. The lips 108 may be extruded so as to be of softer material than the remainder of the extruded material 90, to increase their frictional grip.

In this way, the strip 91 presents the glass-receiving channel 100 in the plane of the window opening so that the sliding window glass enters the channel 100. The outwardly facing surfaces of the lips 102 and 106 are coated with flock where they meet the window glass. This flock is shown at 102A and 106A in FIGS. 7, 8, 8A and 10, but is omitted from the other Figures for clarity.

As shown in FIG. 5, the sealing strip 91 includes further lips 110 and 112 on the outside of the window frame, that is, on the outside edge of the door. These lips 110 and 112 engage the frame of the door opening when the door is closed, to provide a seal around the edge of the door.

The sealing strip 91 may also incorporate a separate metal reinforcing strip 114.

Figure 6:
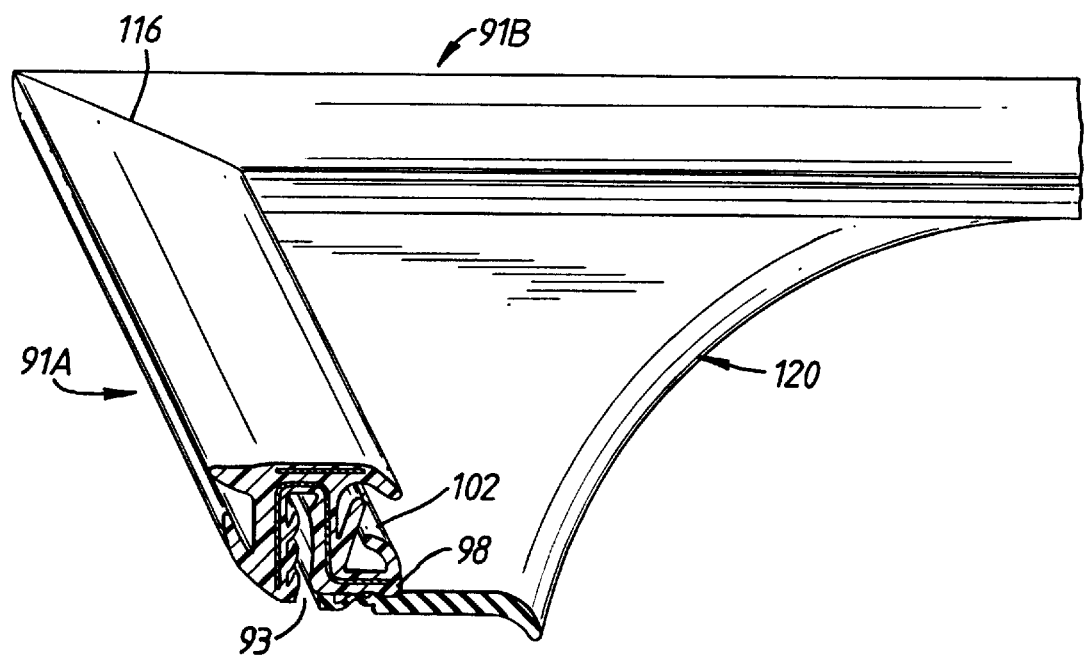
FIG. 6 is a perspective view of the assembly.

At the corner of the window frame formed by the corner support 80 (FIGS. 3 and 4), two lengths of the sealing strip 91 are joined together to match the corner, as indicated in FIG. 6. More specifically, two lengths of sealing strip 91A and 91B are mitre-cut and then joined together along the line 116 (FIG. 6). In addition, and as will be described in more detail below, a moulding operation is carried out to form a flexible corner piece 120 (FIG. 6) from rubber or other suitable material, the corner piece 120 being attached to the underside of the wall 98 of the sealing strips 91A and 91B and having a shape which generally matches, and thus in use covers, the platform 82 of the corner support 80 (see FIGS. 3 and 4).

Figure 7:
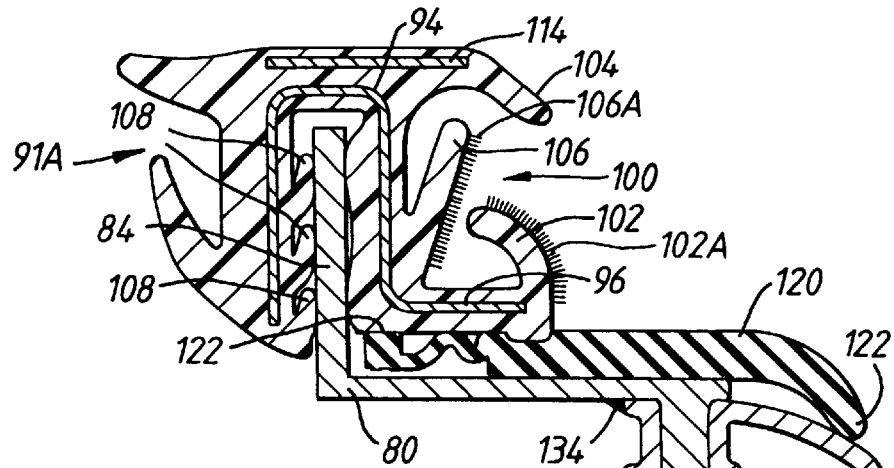
FIG. 7 is a scrap sectional view showing the assembly of FIG. 6 in position on the corner support of FIG. 3.

FIG. 7 shows the sealing strip 91A and the corner piece 120 in position on the corner support 80, and shows how the channel 93 of the sealing strip 91A embraces the flange 84 of the corner support 80. FIG. 7 also shows how the corner piece 120 lies on the platform 82 of the corner support 80.

The corner piece 120 is formed with a curved-over lip 122 which contacts the surface of the aluminium extrusion 20 (FIG. 4).

Figure 8:
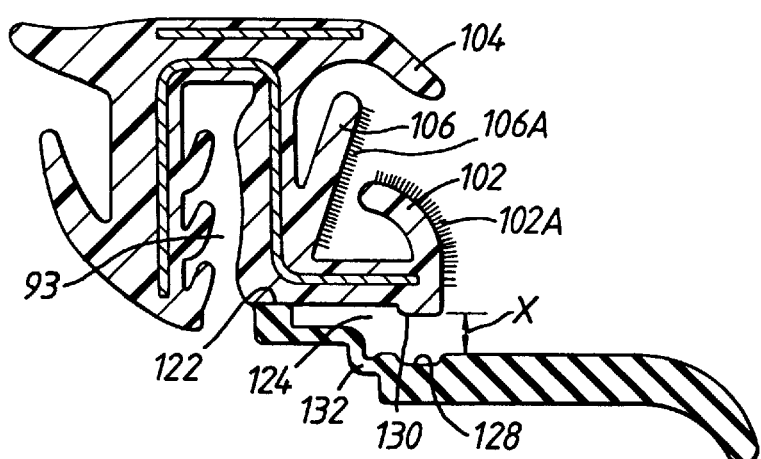
FIG. 8 is a view corresponding to FIG. 7 but showing the assembly immediately after a moulding operation.
Figure 8A:
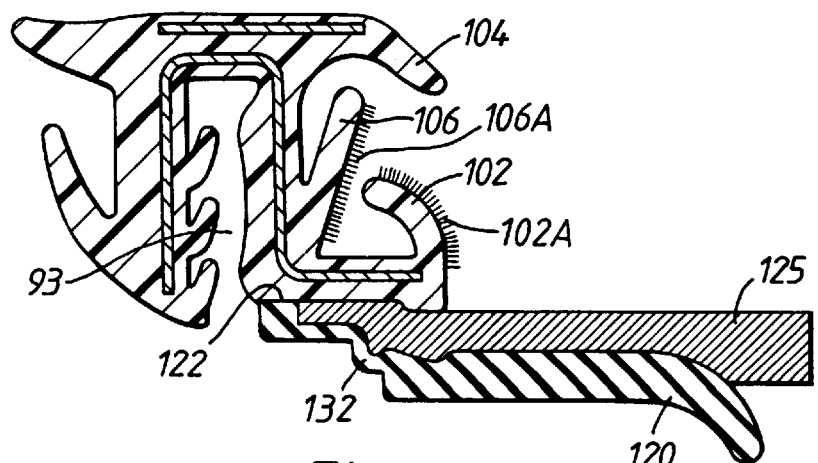
FIG. 8A shows a mould plate used in the moulding operation producing part of the assembly shown in FIG. 8.
Figure 9:
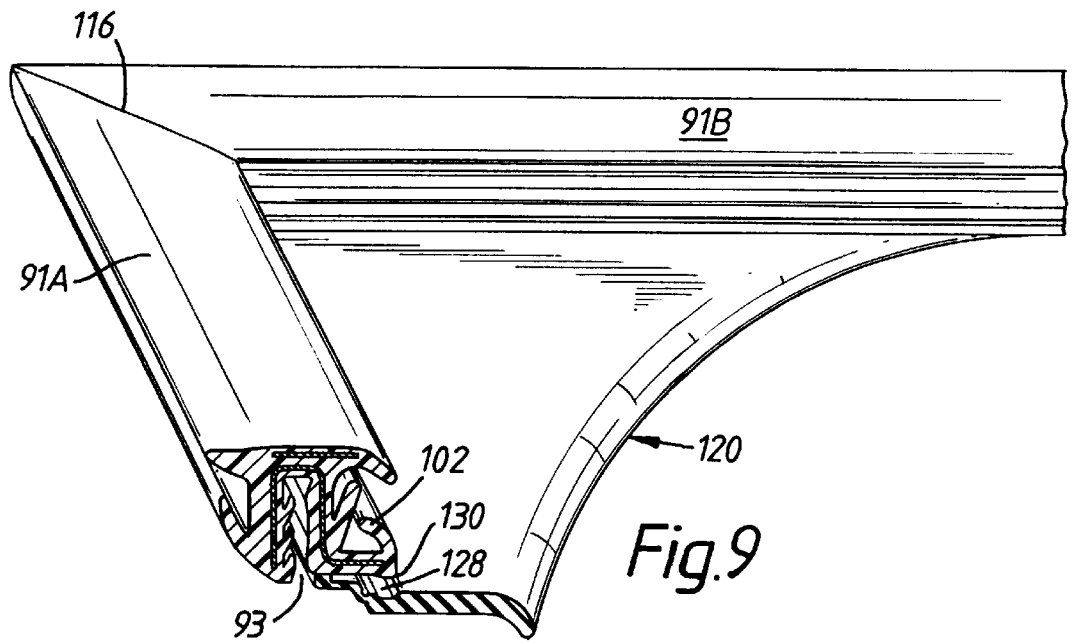
FIG. 9 corresponds to FIG. 6 and shows the assembly of FIG. 6 immediately after the moulding operation.

As indicated above, the corner piece 20 is produced by a moulding operation. The two lengths of strip 91A, 91B joining at the corner (FIG. 6) are placed in a mould (not shown) which has a cavity matching the shape of the corner piece 120 and into which material is forced and heated to mould to the corner piece. FIGS. 8 and 9 show the corner piece 120 after it has been produced by this moulding operation. These Figures show that the corner piece 120 is produced so that it is attached to the sealing strip 91A only over a restricted part area comprising a region 122, adjacent to the mouth of the channel 93. Where the corner piece 120 is not attached to the sealing strip 91A at region 122, it can assume a first position in which it thus has an area spaced from but overlapping the remainder of the area of the wall 98 of the glass-receiving channel 100 to form a gap 124 having a mouth of width "X". This form of construction enables the corner piece 120 to be produced by a moulding operation which avoids the application of excessive heat to the sealing strip and, in particular, to the flock on the surface of the lip 102. The mould cavity in which the corner piece 120 is moulded is formed by an upper mould plate 125 (FIG. 8A) which is positioned where the gap 124 is shown in FIG. 8. The lower mould plate (not shown) is positioned below the upper mould plate, and together the two mould plates are shaped to define the cavity matching the required shape of the corner piece 120. During the moulding operation, heat is applied to form the moulding material in the mould cavity into the desired shape for the corner piece, but the upper mould plate 125 protects the flock on the lip 102 against being damaged by this heat. This process therefore enables the corner piece to be moulded onto already-flocked lengths of the sealing strip. In the absence of the arrangement shown in FIGS. 8 and 9 (in which the corner piece 120 is formed as a flap attached to the sealing strip only over the minor portion 122 but otherwise spaced from the strip by the upper mould plate 125 which forms the gap 124), the potentially damaging effect of the heat on the flock would necessitate carrying out the flocking operation after production of the corner piece 120. Such a separate flocking operation would be complicated and expensive and is avoided in the manner described above.

The moulding operation produces the corner piece with a shallow groove 128 running along its surface. This matches a ridge 130 on the underside of the wall 98, so that the ridge 130 engages in the groove 128 when the sealing strip and corner piece 120 are fitted into position on the corner support 80 (FIG. 7). The corner piece 120 is where it is not attached at region 122 now moves into and held securely in a second position and cannot move relative to the sealing strip 91. Advantageously, the corner piece 120 also incorporates an integral flexible region 132.

FIG. 7 shows how the corner support 80 may be attached to the aluminium extrusion 20 as by welds 134.

Figure 10:
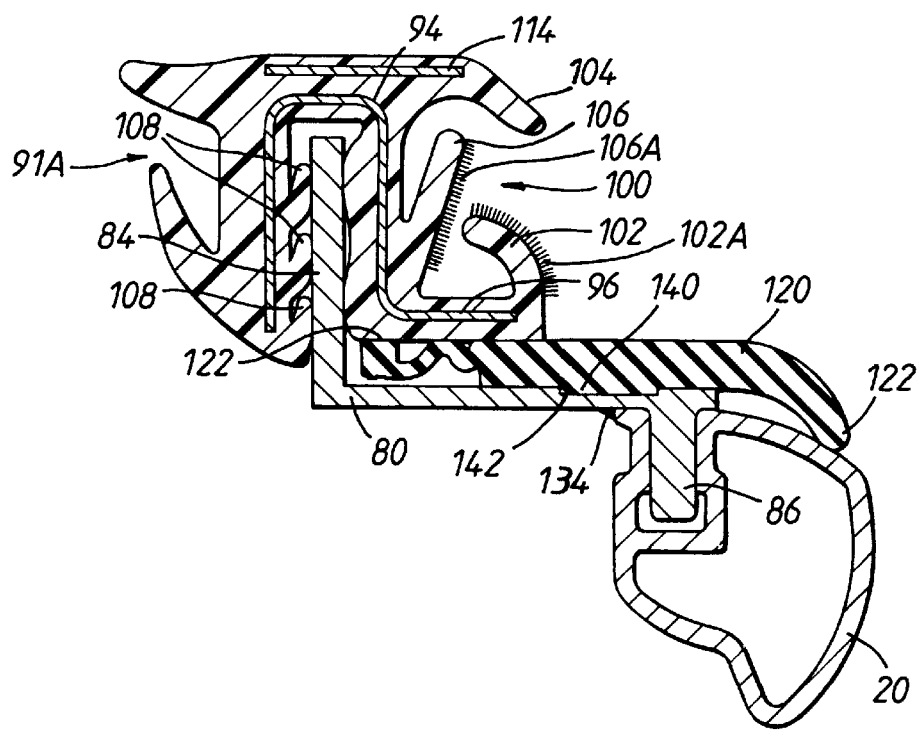
FIG. 10 is a view corresponding to FIG. 7 but showing a modification.

FIG. 10 shows a modification in which the shallow groove 128 in the corner piece 120 is not present, and nor is the matching ridge 130 on the underside of the wall 98. Instead, the corner piece 120 is itself provided with a protruding ridge 140 on its underside which, when the assembly is fitted in position on the corner support 80, engages in a groove 142 in the upper surface of the corner support. In this way, the corner piece 120 is again held securely in position and cannot move relative to the sealing strip 91. The ridge 140 and/or the groove 142 can be dimensioned to take account of manufacturing tolerances.

What is claimed is:

1. A strip assembly for carrying out at least one of sealing and guiding purposes, the assembly comprising support means defining a rigid mounting surface, strip means extending longitudinally and having a surface defining a first predetermined area consisting of a restricted part area and a remaining part area and a portion of flexible material attached to the strip means over the restricted part area and not attached to the strip means over the remaining part area, the portion of flexible material not attached to the strip means defining a second predetermined area overlapping said remaining part area, the strip means including means for attaching it to the support means, said portion of flexible material where it defines said second predetermined area having first and second possible positions relative to the strip means, the first position being a position operative when the strip means is not attached to the support means and being a position in which said portion of flexible material is positioned so that the second predetermined area is spaced by a predetermined spacing from the strip means over said remaining part area, the second position being a position operative when the strip strip means is attached to the support means and being a position in which a major part of the second predetermined area of said portion of flexible material is in contact with the strip means in said remaining part area, said portion of flexible material defining a surface formation distanced along the said portion of flexible material from where said portion of flexible material is attached to said restricted part area and said mounting surface defining a corresponding surface formation, the surface formations interlocking with each other when the strip means is attached to the support means.

2. An assembly according to claim 1, in which said portion of flexible material comprises a flap of the flexible material and in which said restricted part area is adjacent an edge of the flap.

3. An assembly according to claim 2, in which the strip means comprises two sealing strips meeting at, and connected to each other at, a sharp corner, the flap bridging between the two strips.

4. An assembly according to claim 1, in which said portion of flexible material defines a surface formation distanced along said portion of flexible material from where said portion of flexible material is attached to said restricted part area, the surface formation interlocking with a corresponding surface formation within the first predetermined area of the sealing strip means when said portion of flexible material is in the said second position.

5. An assembly according to claim 1, in which the strip means includes means for attaching the strip means to a mounting surface.

6. An assembly according to claim 1, in which said portion of flexible material is held in said second position by the mounting surface.

7. An assembly according to claim 1, in which the strip means includes a flocked region adjacent the first predetermined area.

8. An assembly according to claim 1, in which said portion of flexible material has an extension beyond said strip means in a transverse direction relative to said longitudinal extension of said strip means.

9. A strip assembly of predetermined sharply cornered shape for sealing and guiding a window pane having a matching sharp corner, comprising:

a rigid support shaped to match said predetermined sharply cornered shape;

two strip lengths each extending in a longitudinal direction and secured together to define a sharp corner matching sail predetermined sharply cornered shape and each defining a respective part of a guide channel for receiving the window pane, each strip length defining attachment means for attaching the strip length to the rigid support; and a generally planar portion of flexible material produced in situ by a heat-molding operation so as to bridge across the sharp corner defined by the strip lengths and to overlap a respective predetermined area of each strip length adjacent the guide channel;

said portion of flexible material being separate from each strip length over a major part of said respective predetermined area and being heat-moldedly attached to each strip length over an attachment region forming a minor part of said respective predetermined area, said portion of flexible material having first and second different possible positions relative to the strip lengths, the first position of said portion of flexible material being a position operative when the strip lengths are not attached to the rigid support and being a position in which said portion is spaced from each strip length over the major part of each said predetermined area, the second position of said portion of flexible material being a position operative when the strip lengths are attached to the rigid suppport by said attachment means and being a position in which said portion of flexible material is in contact with each strip length within said major part of each said predetermined area, the rigid support defining a surface for receiving said portion of flexible material and pressing said portion of flexible material into said second position, the surface defining a surface formation facing a matching formation defined by said portion of flexible material, the formations interlocking when said portion is in said second position.

10. An assembly according to claim 9, in which said portion of flexible material has an extension beyond each strip length in a transverse direction relative to the longitudinal extension of each strip length.

11. An assembly according to claim 9, in which said guide channel has a flocked region immediately adjacent said area.

12. A strip assembly of predetermined sharply cornered shape for sealing and guiding a window pane having a matching sharp corner, comprising:

- a rigid support shaped to match said predetermined sharply cornered shape;
- two strip lengths each extending in a longitudinal direction and secured together to define a sharp corner matching said predetermined sharply cornered shape and each defining a respective part of a guide channel for receiving the window pane, each strip length defining attachment means for attaching it to the rigid support; and
- a generally planar portion of flexible material produced in situ by a heat-molding operation so as to bridge across the sharp corner defined by the strip lengths and to overlap a respective predetermined area of each strip length adjacent the guide channel;
- said portion of flexible material being separate from each strip length over a major part of said respective predetermined area and being heat-moldedly attached to each strip length over an attachment region forming a minor part of said respective predetermined area,
- said portion of flexible material having first and second different possible positions relative to the strips,
- the first position of said portion of flexible material being a position operative when the strip lengths are not attached to the rigid support and being a position in which said portion is spaced from each strip over the major part of each said predetermined area,
- the second position of said portion of flexible material being a position operative when the strip lengths are attached to the rigid support and being a position in which said portion of flexible material is in contact with each strip within said major part of each said predetermined area,
- the rigid support defining a surface for receiving said portion of flexible material and pressing said portion into said second position;
- said rigid support including a flange; and
- the attachment means comprising a further channel defined by each strip length for grippingly engaging said flange of the rigid support.

* * * * *